H. A. McLAUGHLIN.
MACHINES FOR DIGGING AND SEPARATING POTATOES.
No. 178,542. Patented June 13, 1876.
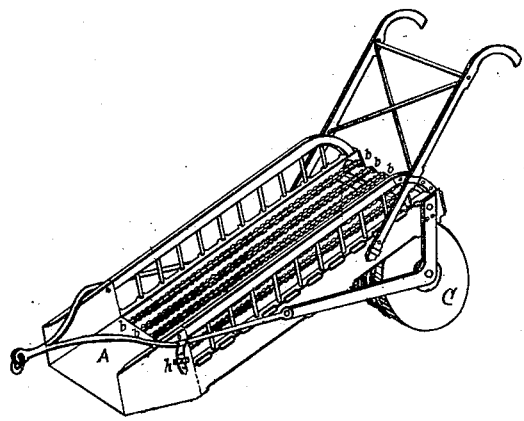
Fig. 1.
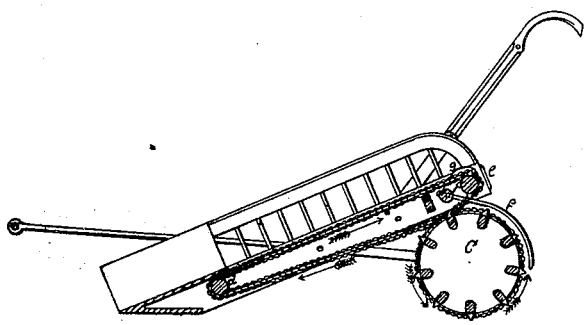
Fig. 2.
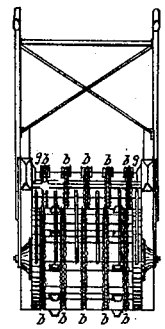
Fig. 3.
Witnesses 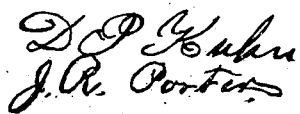
Inventor
Henry A. McLaughlin

UNITED STATES PATENT OFFICE.

HENRY A. McLAUGHLIN, OF KARNS CITY, PENNSYLVANIA.

IMPROVEMENT IN MACHINES FOR DIGGING AND SEPARATING POTATOES.

Specification forming part of Letters Patent No. 178,542, dated June 13, 1876; application filed February 19, 1876.

*To all whom it may concern:*

Be it known that I, HENRY A. McLAUGHLIN, of Karns City, in the county of Butler and State of Pennsylvania, have invented a new and useful Machine for the Purpose of Digging and Separating Potatoes from the Earth, which invention is fully set forth in the following specification, reference being had to the accompanying drawings.

The object of my invention is to raise potatoes from the hills or drills in which they have grown, separating them from the earth at the same time, by the use of a machine, as shown at Figure 1, which consists of a scoop, A, to raise potatoes and earth together and throw them back onto a screen, the screen being formed by the endless chains $b\ b\ b$, &c., Figs. 1 and 3, which chains are carried over rollers in the direction indicated by the arrows in Fig. 2.

The motion is given to the screen by the large open drum or roller C, the roller $e$ to have projecting racks or crotches, over which the chains pass, in order to give the screen an agitating motion, for the purpose of separating the earth from the potatoes, the earth passing through the screen, and the potatoes being carried on the screen and delivered at the rear, over roller $e$, onto the screen $f$, (shown in Fig. 2,) which screen is formed of heavy wires, from whence the potatoes are dropped to the ground.

The large roller C is provided with projections, as shown on Figs. 2 and 3, to prevent it from slipping or sliding on the ground, and to insure it to revolve when the machine is in motion.

The roller $d$ is protected from the dirt by the scoop A, projecting back and over the same. The journals of the roller $e$ are protected from the dirt by the covers $g$. (Shown on Figs. 2 and 3.)

The depth to which the scoop A is intended to go is regulated by the slides and pins at $h$, Fig. 1.

I claim as my invention—

The ground skeleton wheel C and endless chain $b\ b\ b\ b\ b$, in combination with the frame and share A and rollers $d$ and $e$, as and for the purpose specified.

HENRY A. McLAUGHLIN.

Signed in presence of—
D. P. KUHN,
J. R. PORTER.